F. M. COE.
TRACTOR WHEEL.
APPLICATION FILED FEB. 19, 1917.
1,256,113. Patented Feb. 12, 1918.
2 SHEETS—SHEET 1.
Fig. 5.
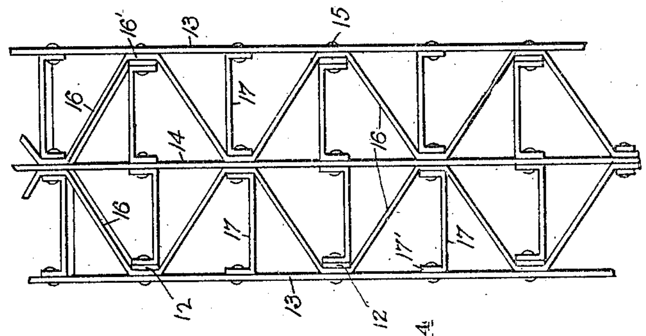
Fig. 2.
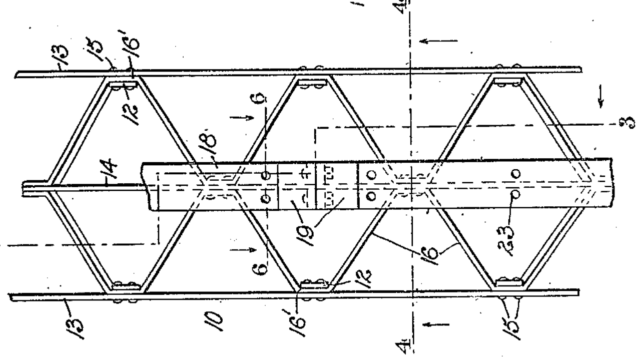
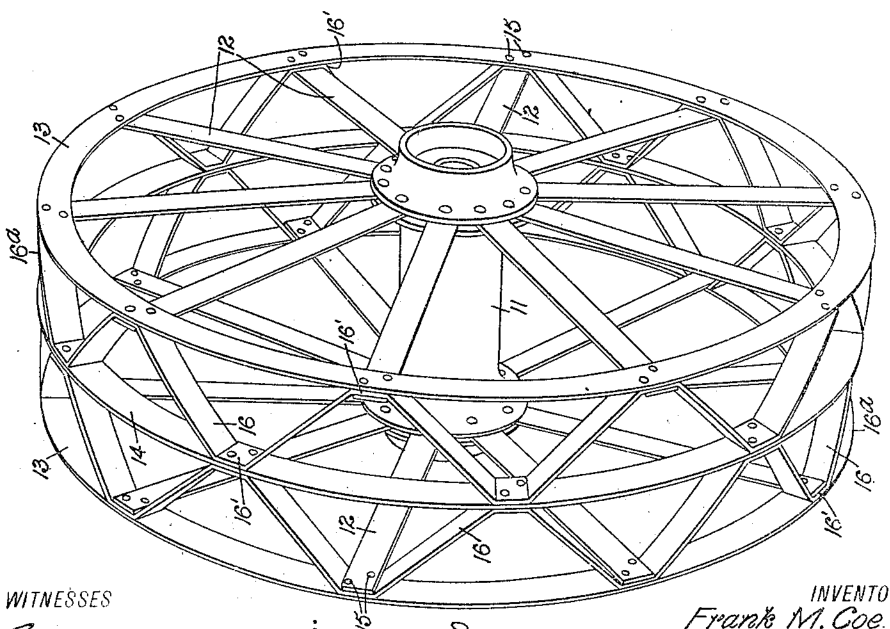
Fig. 1.
WITNESSES
[signatures]
INVENTOR
Frank M. Coe.
BY Munn & Co.
ATTORNEYS F. M. COE.
TRACTOR WHEEL.
APPLICATION FILED FEB. 19, 1917.
1,256,113.
Patented Feb. 12, 1918.
2 SHEETS—SHEET 2.
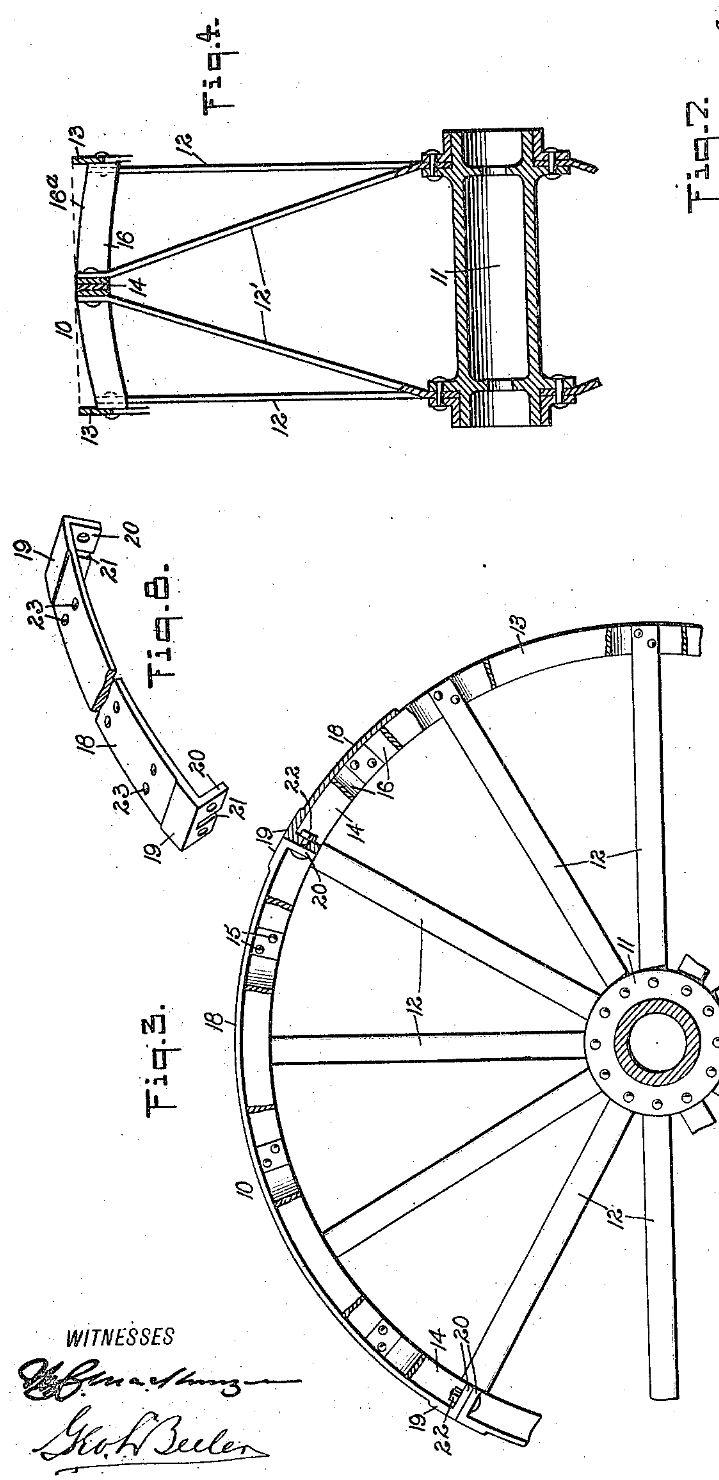
WITNESSES
INVENTOR
Frank M. Coe
BY Munn & Co
ATTORNEYS

UNITED STATES PATENT OFFICE.

FRANK M. COE, OF NEW YORK, N. Y.

TRACTOR-WHEEL.

1,256,113. Specification of Letters Patent. Patented Feb. 12, 1918.

Application filed February 19, 1917. Serial No. 149,469.

*To all whom it may concern:*

Be it known that I, FRANK M. COE, a citizen of the United States, and a resident of the city of New York, borough of Manhattan, in the county and State of New York, have invented a new and Improved Tractor-Wheel, of which the following is a full, clear, and exact description.

This invention relates to vehicle wheels and has particular reference to main supporting or traction wheels for heavy vehicles.

Among the objects of the invention is to provide a wheel possessing maximum traction, strength, rigidity and cheapness with the minimum amount of material.

Another object of the invention is to provide a wheel having maximum traction for use on solid or slippery roads or earth and having means for readily increasing the buoyancy of the wheel when operating over soft or light roads or earth.

A still further object of the invention is to provide a tractor wheel possessing maximum traction, but with little or no possibility for clogging or balling of the tread whereby the effectiveness of the device is enhanced as well as the reduction of power required for its manipulation.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view of a preferred embodiment of the invention designed for maximum traction;

Fig. 2 is a front elevation of a portion of the same with the band attachment applied thereto;

Fig. 3 is a sectional detail on the broken line 3—3 of Fig. 2;

Fig. 4 is a detail of a modification taken on a radial plane corresponding to the line 4—4 of Fig. 2, showing a central series of spokes;

Fig. 5 is a detail view indicating a development of the tread portion of the wheel and indicating an assemblage including transverse as well as the diagonal braces between the tread ribs;

Fig. 6 is a transverse sectional detail on the line 6—6 of Fig. 2, representing the manner of locking the band from lateral displacement on the wheel tread and one means for clamping adjacent ends of band sections together;

Fig. 7 is a detail view indicating the application of the band to the inner portion of the tread and means for holding the same in place; and Fig. 8 is a perspective detail view of one of the band sections.

Referring now more particularly to the drawings, I show a wheel of skeleton construction comprising a tread portion 10, a hub 11, and spokes 12. The construction of the hub may be varied considerably depending upon the nature of the machine with or upon which the wheel is to be used. Likewise the particular design or relative arrangement of the spokes and tread portions of the wheel may be modified to a considerable extent without departing from the spirit of the invention. I prefer, however, to construct the rim and spokes of comparatively flat or thin strips of metal whereby I aim to accomplish maximum strength and rigidity with the minimum amount of weight and expense.

The tread portion 10 is illustrated herein as comprising a plurality of parallel annular ribs 13 and 14. Each of these ribs is in the nature of a flat ring of metal having comparatively little thickness in a direction parallel to the axis of the wheel, but with considerable width or depth considered radially of the wheel. These ribs are shown as three in number with the intermediate rib 14 spaced equally from the two outside ribs 13 and also are all shown as of equal diameter. I wish it to be understood, however, that with respect to the spacing of these ribs, their relative diameters and the precise number, I do not wish to be unnecessarily limited, reserving the right to employ more or less than three and to arrange them otherwise differently if desired.

As will be noted from the foregoing and the drawings, the annular ribs 13 and 14 are all arranged for the purpose of providing the maximum strength in radial directions. The spokes likewise are preferably so disposed as to afford the greatest strength or rigidity to enable them best to resist bending or breaking strains in circumferential or tangential directions, the longer dimension of each spoke cross section being circumferential of the wheel. The spokes 12 are secured in any suitable manner at their inner ends to the hub 11, and at their outer ends they are secured to the ribs 13, as shown in Fig. 1, or to both the ribs 13 and the intermediate rib 14, as shown in Fig. 4. The connections between the spokes and the ribs may be effected by any convenient or suitable mechanism means as, for example, short bolts or rivets 15.

With the tread ribs constructed and arranged as indicated, I provide any suitable diagonal or transverse bracing means extending from one to the next all the way around the tread. The principal bracing means consists of a bracing strip 16 extending from a rib 13 to the rib 14 in a zigzag manner, said strip 16 being bent so as to form short sections 16′ which lie against the opposing faces of the ribs 13 and 14 respectively, while the main portions of said strip extend diagonally from one portion 16′ to the next. Each of these strips 16 corresponds in the character of the metal somewhat to the ribs 13 and 14, in that each of them is made as from a flat annular strip of suitable radius to insure that the outer or tread edge 16[a] of each of the diagonal portions will lie in the geometric cylinder determined by the outer or tread edges of the ribs 13 and 14. In other words, the wheel is so constructed and assembled that all points of the outer edges of the three ribs and all of the bracing elements will have bearing contact upon the flat surface upon which the wheel may roll. The fasteners 15, or their equivalent, serve not only to secure the outer ends of the spokes to the ribs, but at the same time serve to fasten the bracing means thereto. I wish to note at this time also that the short flat portions 16′ are so proportioned that the ends of the spokes coöperate therewith, precisely fitting against the flat surfaces thereof, or in other words, the diagonal portions of the bracing strips are bent at angles from the ends of the flat portions at just the right distances to snugly embrace the edges of the spokes, so that when these three parts, namely, the ribs, the bracing means, and the ends of the spokes, are locked together, a device having the maximum strength and stiffness is secured.

As indicated in Fig. 5, any suitable number of transverse braces 17 may be provided in connection with the diagonal braces 16 with respect to any type or construction of my improved wheel, that is to say, irrespective of the number or arrangement of spokes. Each of these braces 17 is provided with right angularly arranged lugs or feet 17′, fitting flatly against either the ribs or the parts fixed thereto, and, as in the other forms of the construction, these braces are adapted to be secured rigidly in place by rivets or their equivalent, with their outer edges registering with the outer edges of the other main parts of the wheel.

The wheel as thus far described is designed to provide maximum traction or grip upon the roadway, and for certain classes of traffic, the grip or traction thus provided is ideal, taking into account the relative stiffness, strength and cheapness of the construction. Under other conditions, however, such as operating over soft earth, as during the operation of pulverizing or seeding a field, it is desirable to apply means to the wheel to increase its buoyancy or to prevent it from sinking too deeply into the earth and yet without materially impairing the desirable traction. To effect this result, I provide a band 18 of any suitable width, thickness or material, the same being adapted to be secured either upon the outer surface of the tread 10, as shown in Figs. 2 and 3, or upon the inner surface of the tread, as shown in Fig. 7. This band may be made of any suitable number of sections, depending upon the manner of application or the convenience of the operator. The ends of each section are preferably upset or thickened, as shown at 19 and bent inwardly radially, as shown at 20, forming a lug having a slot 21 adapted to straddle the central rib 14. The adjacent lugs 20 are adapted to be drawn and locked together by means of bolts 22, or their equivalent. By means of these lugs 20 straddling the rib 14, the band may be held from lateral movement, depending, however, upon the number of sections or joints possessed by the band. Between the joints, however, I prefer to provide any suitable number of pairs of lugs 23 which engage upon opposite sides of the outer edge of the rib 14. These lugs may be formed by punching inwardly a part of the way through the band or by other equivalent means. Obviously these bands may be provided in sets of different widths so as to meet readily varying conditions. The matter of application of the bands to the wheels in practice constitutes a convenient expedient. Inasmuch as the lug portions 20 of the bands extend between adjacent parts of transverse or diagonal braces, there is no possibility for the bands to creep circumferentially of the wheel.

If the band 18′ is applied within the tread 10, it may be locked in place conveniently in sections or otherwise by means of U-bolts 24, or their equivalent, extending inwardly over the central rib 14, the inner ends of the bolts passing through the band 18 and being secured thereto by nuts 24′ on the inner side of the tread. In this form of the device, it is apparent that the high degree of traction effected by my construction is not materially reduced, while the desired amount of buoyancy for the wheel will be assured. For most purposes, the width of the bands will never be equal to the full tread of the wheel, and hence there is always assured free open spaces inwardly through the tread that will make it impossible for the wheel to ball or clog up when running through any kind of snowy or muddy roads or tracks.

I claim:

1. In a tractor wheel, the combination of a hub, a tread portion, and connecting means between the hub and the tread portion, said tread portion comprising a plurality of annular ribs arranged in spaced parallel relation to each other, bracing means arranged in a zigzag manner between adjacent ribs all the way around the tread, transverse braces extending directly between adjacent ribs in directions parallel to the axis of the wheel, and means rigidly securing all of the bracing means to the respective ribs.

2. In a wheel, the combination of a hub, a tread portion, and a series of spokes extending between the tread portion and the hub, said spokes and tread portion being all formed of metal of uniform cross section, and said tread portion comprising a plurality of spaced annular ribs and bracing strips extending between the ribs and circumferentially around the tread, said bracing means including diagonal portions, the outer ends of the spokes being locked between adjacent diagonal portions.

3. In a wheel of the character set forth, the combination of a hub, a tread portion, and a series of spokes extending between the hub and the tread portion, said tread portion and spokes being made of flat metal strips of uniform cross section, said tread portion comprising a plurality of spaced annular ribs, the wider dimension of the metal of which is radial with respect to the wheel, bracing means extending between adjacent ribs both diagonally and circumferentially of the tread, portions of said bracing means being fitted squarely against the opposing faces of the ribs forming flat portions substantially of the same length circumferentially as the width of the spokes fitted therein, and fastening means securing the outer ends of the spokes, the ribs, and the bracing means rigidly together.

4. In a tractor wheel, the combination of a hub, a tread portion and connecting means between the hub and the tread portion, said tread portion comprising a plurality of annular ribs arranged in spaced parallel planes, a bracing strip arranged in a zigzag manner between adjacent ribs all the way around the tread, transverse braces extending directly between adjacent ribs in directions parallel to the axis of the wheel, and means rigidly securing all of the bracing means to the respective ribs.

5. In a tractor wheel, the combination of a hub, a tread portion and a series of spokes extending between the tread portion and the hub, said tread portion comprising a plurality of spaced parallel ribs, and bracing strips extending between the ribs and circumferentially around the tread, said bracing means including diagonal portions, the outer ends of the spokes being locked between adjacent diagonal portions.

6. In a tractor wheel, the combination of a hub, a tread portion and a series of spokes extending between the hub and the tread portion, said tread portion and spokes being made of flat metal, said tread portion comprising a plurality of spaced parallel annular ribs, the wider dimension of the metal of which being radial with respect to the wheel, a bracing strip extending between adjacent ribs both diagonally and circumferentially of the tread, portions of said strip being fitted squarely against the opposing faces of the ribs forming flat portions substantially of the same length circumferentially as the width of the spokes fitted therein, and fastening means securing the outer ends of the spokes, the ribs, and the bracing means rigidly together.

7. In a tractor wheel of the character set forth, a tread portion including a flat annular rib lying in a plane perpendicular to the axis of the wheel, a sectional metal band having the ends of its sections constituting lugs straddling said rib, detachable fastening means binding adjacent lugs together, and pairs of inwardly punched lugs coöperating with the rib aforesaid, to prevent lateral movement of those portions of the bands between the end lug portions.

FRANK M. COE.